Aug. 4, 1931.  J. CARRIE ET AL  1,817,063
TRANSMISSION MECHANISM
Filed Nov. 3, 1928   8 Sheets-Sheet 6
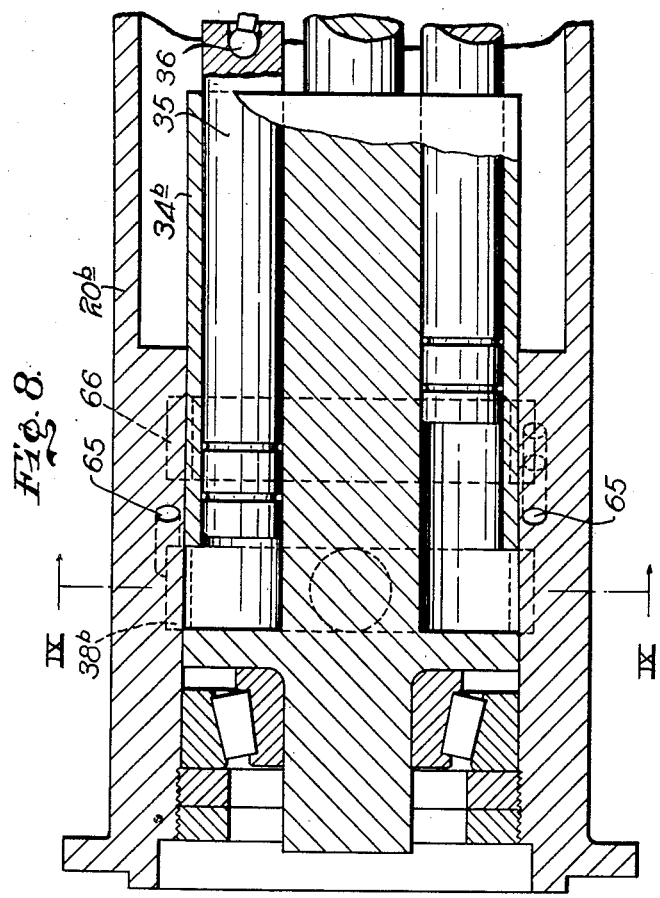
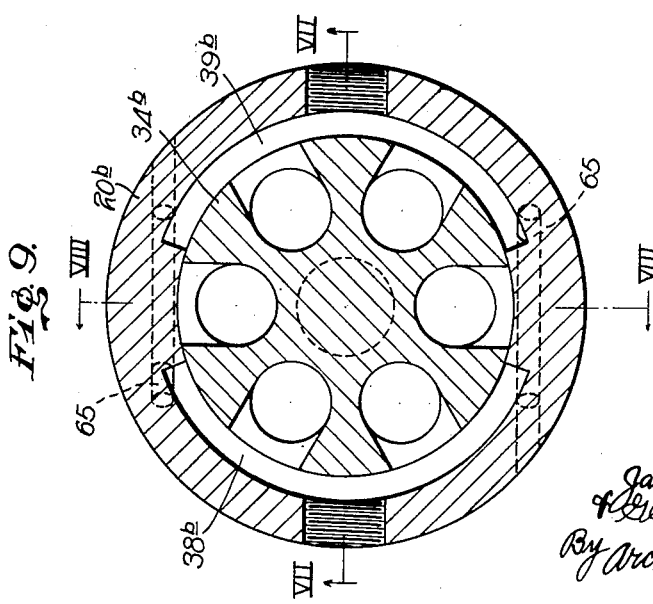
INVENTORS
James Carrie
& George E. Howard
By Archworth Martin
Attorney

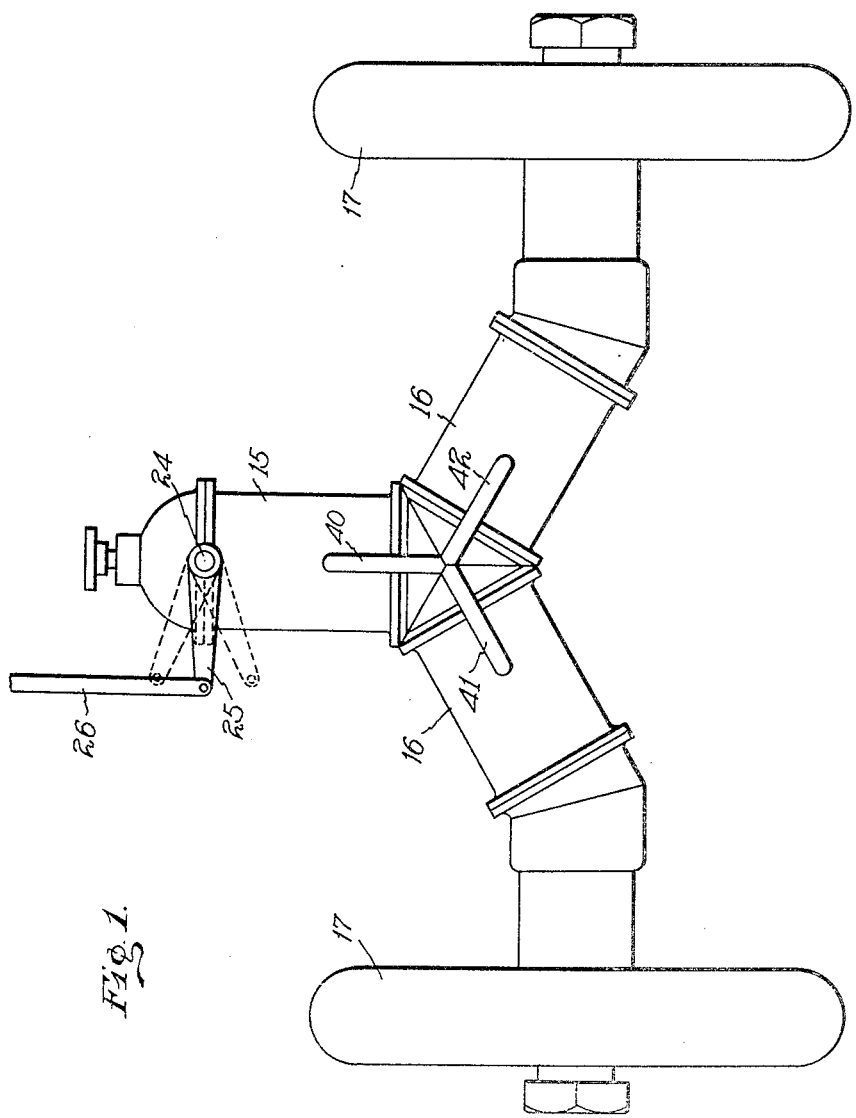

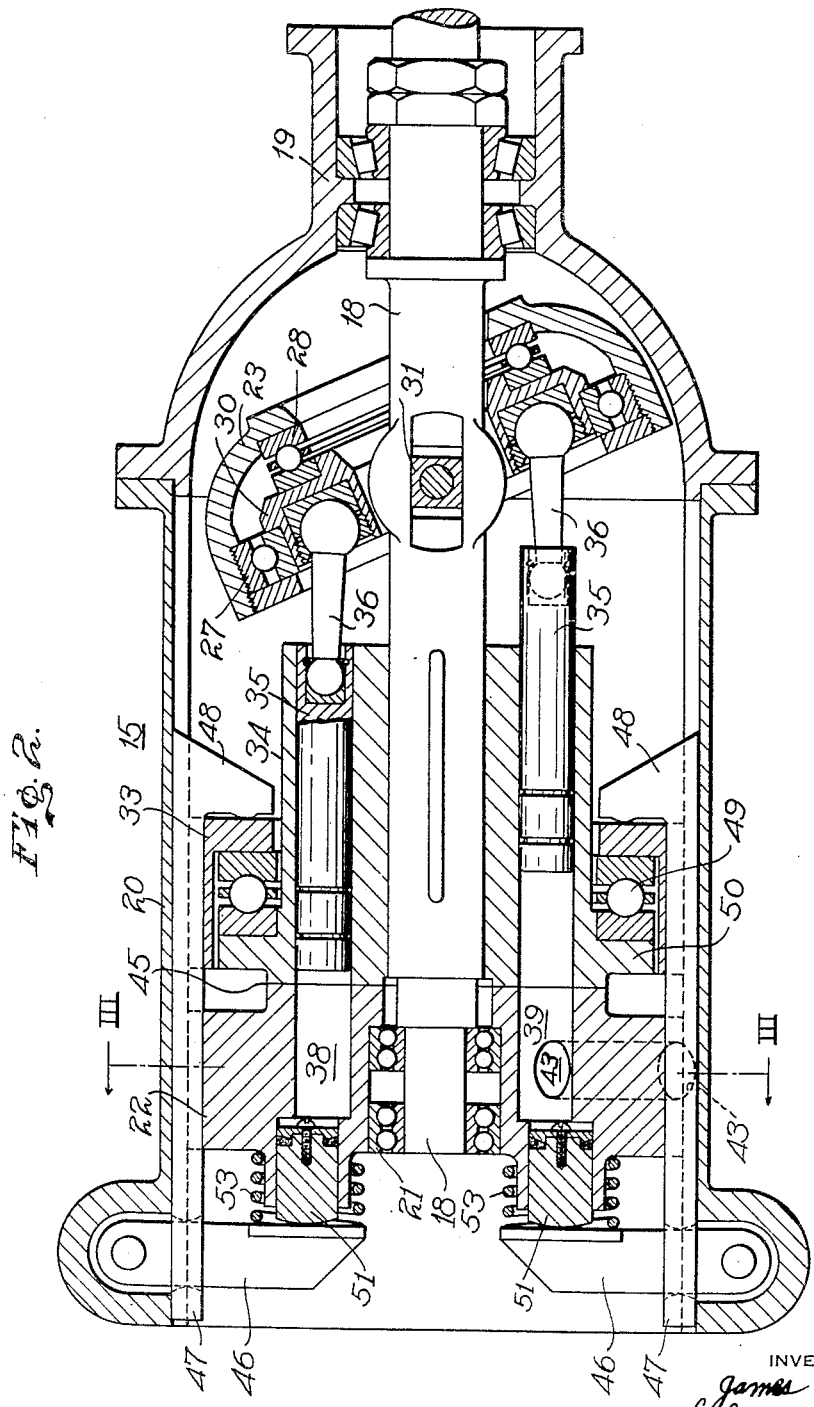

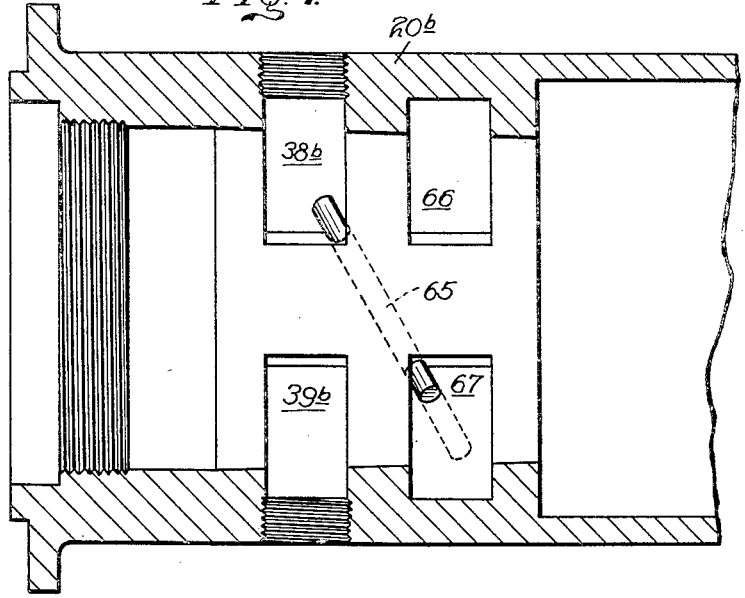
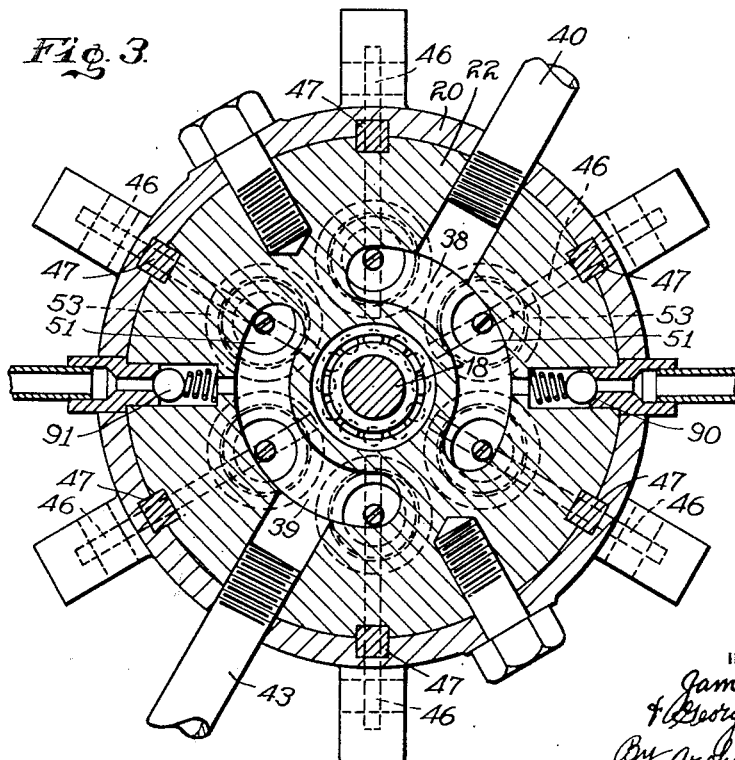

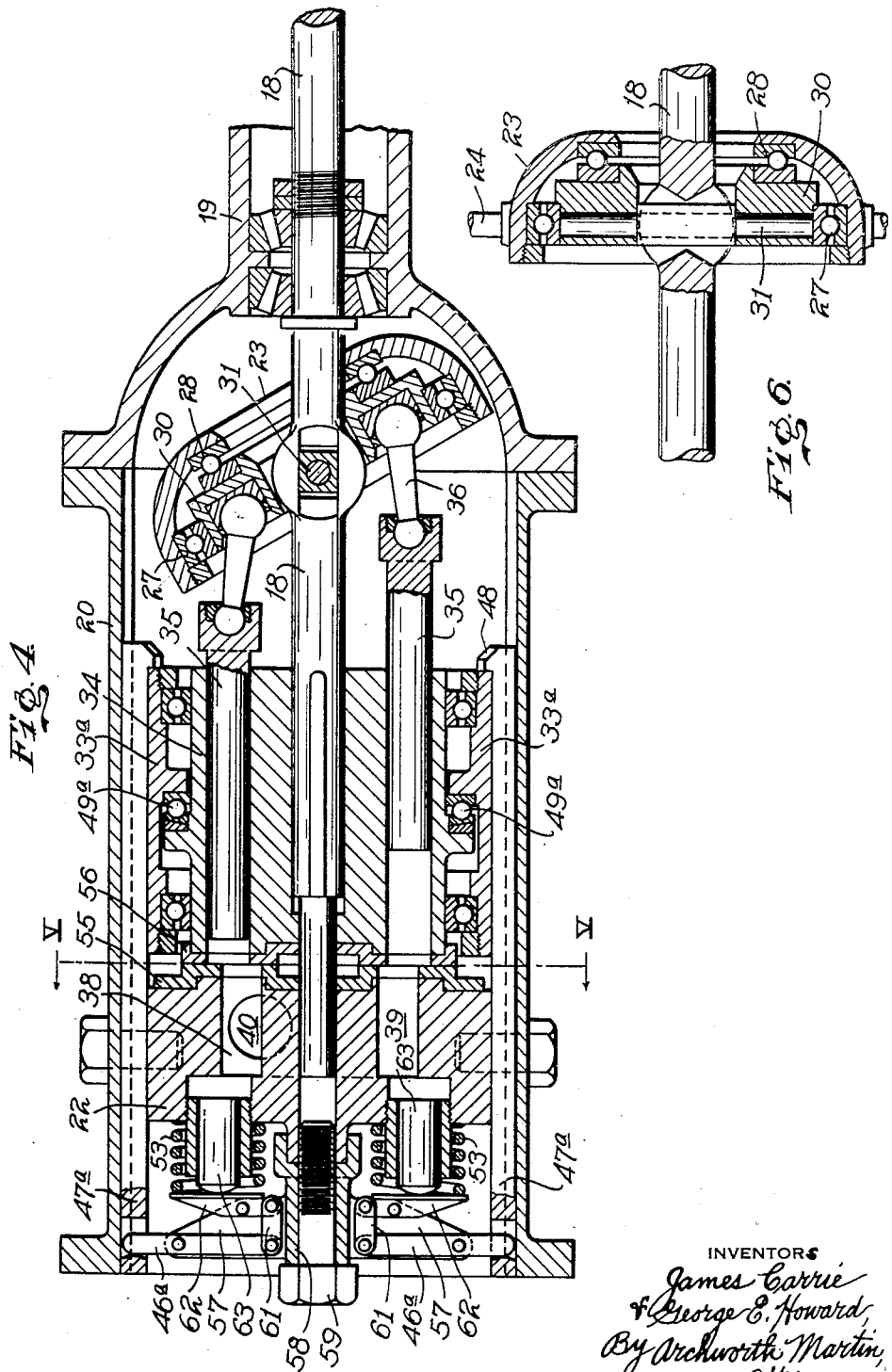

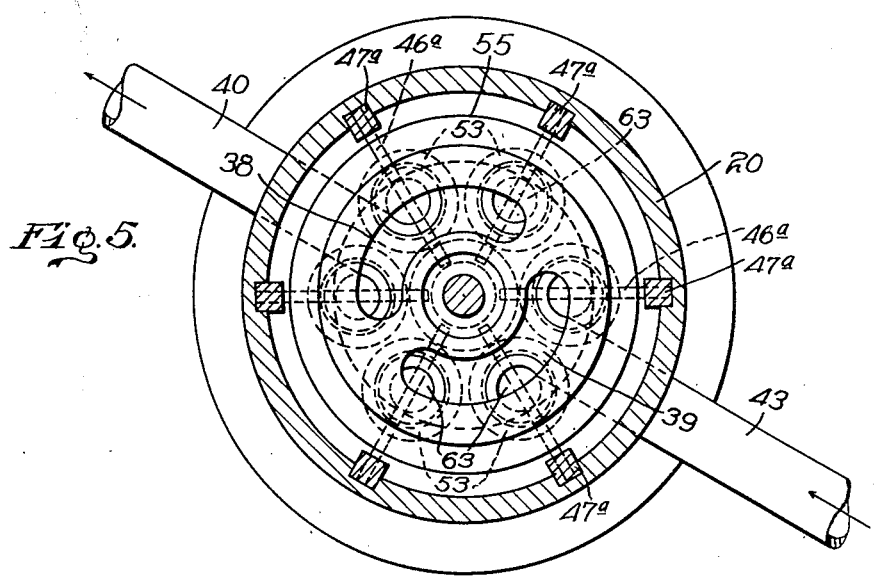
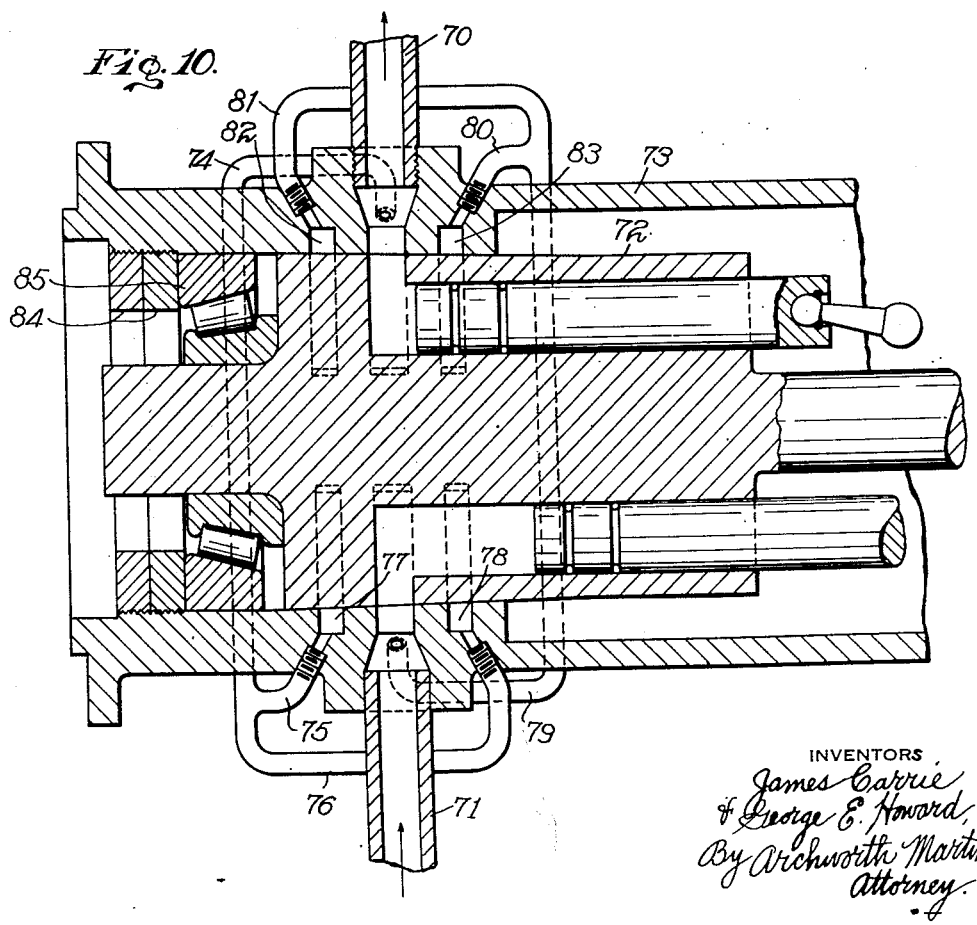

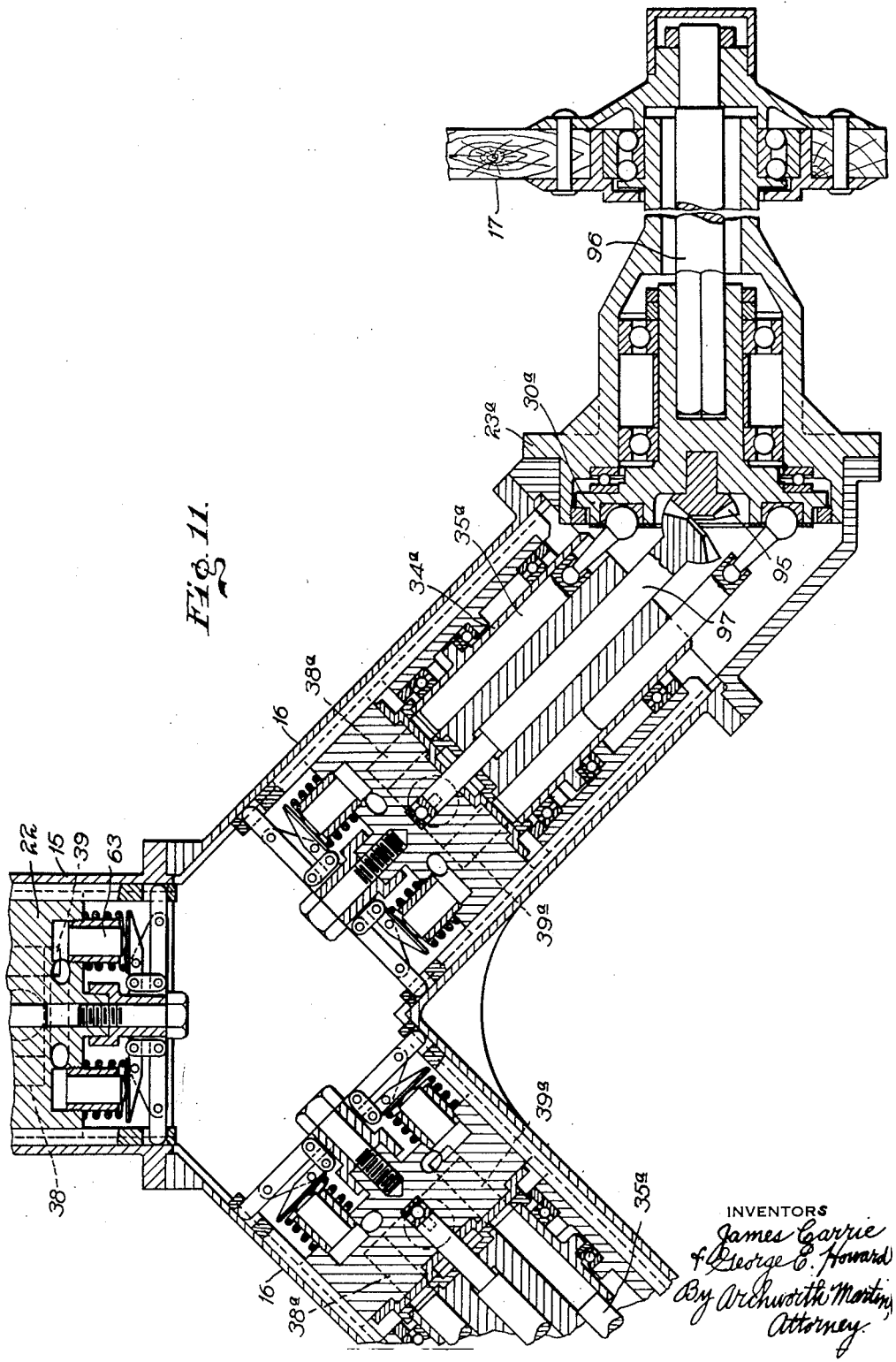

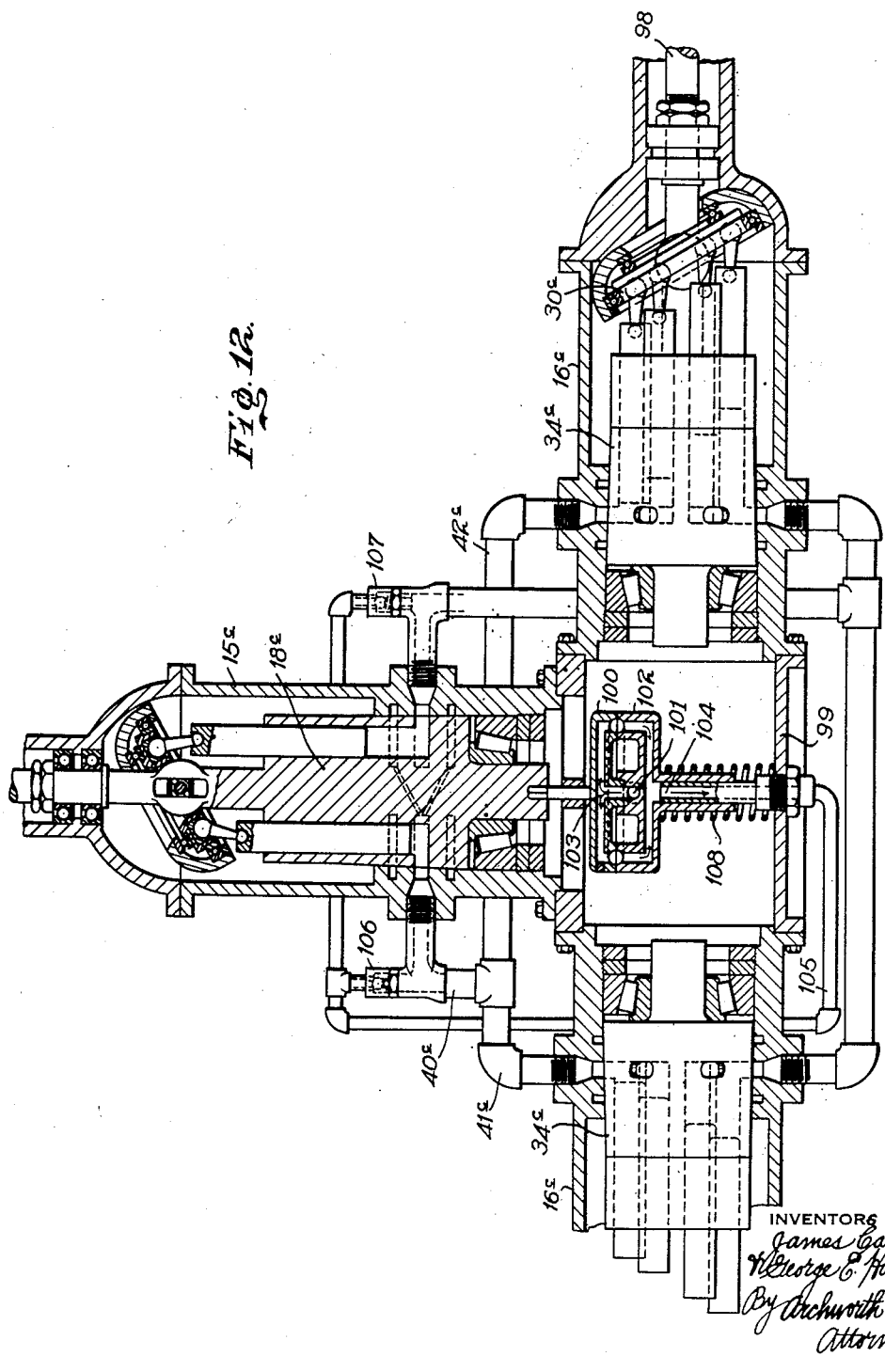

Patented Aug. 4, 1931

1,817,063

UNITED STATES PATENT OFFICE

JAMES CARRIE AND GEORGE E. HOWARD, OF BUTLER, PENNSYLVANIA

TRANSMISSION MECHANISM

Application filed November 3, 1928. Serial No. 316,972.

Our invention relates to fluid transmission mechanism of the type wherein the pressure generating unit includes a cylinder barrel containing a plurality of cylinders and pistons, the said parts being rotatable as a unit and the pistons simultaneously reciprocated to place fluid, such as oil, under pressure, the pressure being utilized to impart power to an element which is to be driven.

The unit referred to may be termed a "generator" and supply fluid to similarly-formed units which we will term "motors". The motors actuate the element to be driven.

The general arrangement just referred to is of more or less common form, but, as heretofore constructed, such devices possessed objectionable features, such as limitations in the degree of fluid pressure which would be safely developed without leakage of the fluid, binding of the parts, etc., with the result that for the transmission of the heavier loads, extremely bulky apparatus has been required, because the pounds pressure per square inch of piston area has been necessarily limited to an undesirable degree.

One object of our invention is to provide an apparatus of the type referred to, means whereby greater horse power may be developed through the use of machines or apparatus much smaller than those heretofore deemed necessary.

Another object of our invention is to provide a device of the character described wherein there is less tendency toward leakage of the fluid between relatively moving parts of the system.

Another object of our invention is to provide means for preventing binding of certain of the moving parts under pressures developed in the system.

Another object of our invention is to provide means for preventing leakage of fluid between certain of the moving parts of the system and for nevertheless maintaining a supply of lubricant between such surfaces, even under extremely high pressures.

Still another object of our invention is to simplify and improve generally the structure and operation of devices of the character referred to.

Some of the forms which our invention may take are shown in the accompanying drawings wherein Figure 1 is a plan view showing one manner in which the invention may be employed; Fig. 2 is a longitudinal sectional view, on an enlarged scale, of the generating unit of Fig. 1; Fig. 3 is a cross sectional view taken on the line III—III of Fig. 2; Fig. 4 is a longitudinal sectional view similar to Fig. 2, but showing a modification of certain of the parts thereof; Fig. 5 is a view taken on the line V—V of Fig. 4; Fig. 6 is a view of certain of the parts of Figs. 2 and 4, but taken at right angles thereto and in another position of adjustment; Fig. 7 is a longitudinal sectional view showing means whereby the rotating cylinder barrels of Figs. 1 to 6 may be counterbalanced, or counter thrusts provided, against movement thereof radially under the thrusts resulting from the development of fluid pressures therein; Fig. 8 is a detailed view of the structure of Fig. 7, taken on the line VIII—VIII of Fig. 9, and not only making provision for counterbalancing of the said thrusts, but also for taking up all wear upon the periphery of the cylinder; Fig. 9 is a view taken on the line IX—IX of Fig. 8, Fig. 10 is a view similar to Fig. 8, but showing still another modification; Fig. 11 is a fragmentary sectional view, on an enlarged scale of the structures of Figs. 1 and 4, and Fig. 12 is a modification of the arrangement of Fig. 11.

Referring more particularly to Fig. 1, we show a fluid pressure generating unit 15 from which pressure is supplied to motor units 16 that transmit the power to traction wheels 17 of a vehicle. The details of structure of the generating unit 15 are shown in Figs. 2, 3 and 6.

In Fig. 2, a shaft 18 is driven from any suitable source of power, such as an internal combustion engine, its front end being supported in bearings mounted within the forward end 19 of a casing 20, and whose rear end is supported in bearings 21 that are mounted in a manifold block 22 within the casing 15.

A swash plate 23 is tiltably supported within the casing 20 upon trunnions 24 (Fig. 1) that are rigid with the swash plate and one of which carries a crank arm 25 to which is connected an operating link 26. It will be seen that upon reciprocation of the link 26, the swash plate will be tilted upon its trunnions, through movement of the crank 25 as indicated by dotted lines in Fig. 1. Annular ball races 27 and 28 are mounted within the swash plate to provide radial and axial thrust surfaces for ball bearings interposed between such raceways and a socket ring 30. The socket ring 30 is tiltably, but non-rotatably, keyed to the shaft 18 by a pin 31 which extends through an opening in the shaft 18. Upon tilting of the swash plate 23, as above explained, the socket ring 30 will also be tilted, the opening through the shaft 18 permitting the pin 31 to rock therein. The mid portion of the pin is flattened on its sides so that it will have greater bearing area against adjacent walls of the opening in the shaft, and its ends are rounded and extend into the ring 30, thus permitting of the necessary slight rotative movement of the pin in the ring during rotation of the ring.

A lining sleeve 33 is slidably, but non-rotatably, supported within the casing 20 and surrounds a cylinder barrel 34 which has six cylindrical bores each containing a piston 35. The outer ends of the pistons 35 each have ball-and-socket connection with a connecting rod 36 whose outer ends have ball-and-socket connection with the socket ring 30. When the swash plate 23 and the socket ring 30 are inclined as shown in Fig. 2, rotation of the socket ring will effect reciprocation of the pistons 35 within their respective cylinders, thus imparting a pumping action thereto.

The barrel 34 is keyed to the shaft 18, so that it rotates therewith and with the socket ring 30. The cylindrical bores are open at their inner ends, and during rotation of the cylinder barrel are successively brought into registry with arcuate chambers or headers 38 and 39 formed in the header block 22, as shown more clearly in Figs. 2 and 3. A conduit 40 leads from the chamber 38 and has branches 41 and 42 (Fig. 1) communicating with the mechanisms within the chambers 16, as hereinafter explained, while a conduit 43 connects the chamber 39 with the units 16 at points opposite to those at which the branches 41 and 42 are connected thereto.

During rotation of the socket ring 30 and the cylinder barrel, with the socket ring inclined as shown in Fig. 2, the pistons 35 when passing over the chamber 39 will be drawn to the right, thus effecting intake or suction through the conduit 43 and the header chamber 39. Upon further rotative movement, these particular pistons will be forced inward, as shown at the upper side of Fig. 2, at which time they are opposite to the header chamber 38, whereupon the fluid taken in upon the suction stroke will be discharged under pressure through the chamber 38 and the conduit 40 to the units 16. (Fig. 1.)

The angle of the swash plate 23 and hence the length of stroke of the pistons, is determined by the position in which the crank 25 is held. If the swash plate is moved to a plane perpendicular to the axis of the shaft 18, there will be no reciprocatory movement of the pistons 35 and hence no pumping action exerted upon the liquid, this position of course being the neutral position. If tilting movement of the swash plate is continued beyond the perpendicular plane, the direction of drive will, of course, be the reverse of that which results from the inclination shown in Fig. 2.

The mechanisms within the casings 16 are each similar to that within the casing 20, except for the swash plate which may be mounted permanently at any suitable angle instead of being adjustable, as in Fig. 2. It will be seen that if fluid under pressure were supplied through the conduit 43 and the header chamber 39 of Fig. 2, a driving action would be exerted upon the pistons as they pass over the chamber 39, thus driving the shaft 18. In this case, the header chamber 38 would be the low pressure chamber and fluid would be discharged therethrough. It is upon this principle that the mechanisms within the units 16 operate, and power thereby supplied to the traction wheels 17. If the swash plate 23 is tilted and the vehicle should coast down a hill with the motor or engine (not shown) which drives the shaft 18 idling, fluid would be pumped, through rotation of the wheel 17 into the chamber 39, thus driving the shaft 18 against the compression of the engine and thereby setting up a breaking force against movement of the vehicle.

Since the header block 22 is stationary and the cylinder barrel 34 rotates, it is essential to maintain their coengaging ends in sufficiently snug contact to prevent leakage of oil between their contacting surfaces 45 but these surfaces must not be so tightly held in engagement as to force lubricant therefrom or to create too much friction through turning movement of the cylinder barrel. For this reason, we provide means for maintaining the surfaces 45 in engagement, with the required degree of pressure.

As shown in Figs. 2 and 3, we pivotally mount a series of levers 46 within the casing 20. These levers extend through the lower ends of pull rods 47 which extend upwardly in slots formed upon the inner surface of the casing 20 and the exterior surface of the block 22 and the sleeve 33. The upper ends of the rods 47 have hook portions 48 which overlie the outer enlarged end of the sleeve 33. Ball bearings 49 are interposed between this outer end of the sleeve and a rib or flange 50 formed upon the inner end of the cylinder barrel 34, to serve as thrust bearings for taking up the thrust imposed when the pull rods 47 are drawn to the left for the purpose of holding the surfaces 45 of the cylinder barrel and the block 22 in snug engagement.

The degree of pull by the rods 47 is dependent upon the amount of fluid pressure in the chamber 38, for example, since such pressure serves to move pistons 51 against the levers 46, thus tending to rock them about their pivots and causing them to pull upon the rods 47. A spring 53 is interposed between each of the levers 46 and the adjacent surface of the header block 22, so that the cylinder barrel 34 will normally be held in engagement with the block 22, with sufficient force to prevent leakage of fluid past the surfaces 45.

It will be seen that when the header chamber 39 is functioning as the high pressure chamber, the operation as just described will be effected at that side of the block 22, instead of at the chamber 38.

Those end portions of the cylinder barrel 34 overlying the arcuate chambers 38 and 39, as viewed in Fig. 3, are subject to the reactive pressures of the fluid. For instance, if the chamber 38 happens to be the pressure chamber and the chamber 39 the suction or intake chamber, the cylinder barrel will tend to tilt in its casing 33 and to squeeze the lubricant out from between portions of the bearing surfaces 45.

The pistons 51 and levers 46, at the high pressure side of the barrel will be actuated by the fluid pressure to exert pull upon the rods 47, and thus counter-act said reactive force to a degree dependent upon the pressure in the chamber. The exposed areas of the pistons relative to the exposed area of the said end portions of the cylinder barrel, and the leverages of the members 46, are such that there is adequate compensation for the reactive thrusts.

As shown clearly in Fig. 2, for example, the cylindrical bores in which the pistons 35 operate are unrestricted at their discharge ends. This is an important feature, since on the compression stroke there is no restriction to the discharge from the bores, thus permitting more rapid discharges and greater speed, avoiding unnecessary heating of the oil or other motive fluid, and reducing power losses. Furthermore, this avoidance of restriction to fluid flow is of advantage in connection with the suction strokes of the pistons, both by way of reducing power losses and also avoiding tendency of the cylinder barrel at the suction side to be drawn away from the manifold block 22, through suction of the pistons, which would result in tendency of the bearing surfaces 45 to be separated, at the suction side of the barrel. Again, where there is no restriction of the cylinder bore, there is more certainty that a full charge will be drawn in on the suction stroke.

Referring now to Figs. 4 and 5, we show an apparatus which corresponds largely to the structure shown in Figs. 2 and 3, but wherein wearing plates 55 and 56 of hardened steel or the like are interposed between the adjacent ends of the cylinder barrel and the header block, instead of permitting the adjacent ends of such parts to have direct engagement with one another. The wearing plate 55 has openings corresponding to the arcuate header chambers 38 and 39 of the block 22, while the plate 56 has openings corresponding to the cylindrical bores in the cylinder barrel 34, such plates forming in effect continuations of the block and the barrel, respectively.

Another feature of distinction found in Figs. 4 and 5 resides in the manner in which pressure is exerted upon the cylinder barrel 34 to counteract end thrusts on the barrel, as above explained. In this case levers 46a are pivotally mounted upon bosses or lugs 57 that extend radially from a sleeve 58 that is secured by a screw 59 to the block 22. The levers 46a at their outer ends extend through pull rods 47a, the outer ends of which overlie the outer end of the sleeve 33a in which the cylinder barrel turns. A thrust bearing 49a is interposed between annular ribs formed on the sleeve and the cylinder barrel respectively.

The levers 46a are connected through links 61 to levers 62 that are pivoted also to the lugs 57. Pistons 63 whose upper ends are exposed to pressure from within the chambers 38 and 39 bear upon the levers 62, so that fluid pressure will be thereby transmitted to the pull rods 47a, as in Fig. 2.

In Figs. 7, 8 and 9, we show a barrel 34b from which discharge is effected radially from the bores instead of from their ends as in Fig. 2. A radial thrust is exerted upon the cylinder barrel 34b, through pressure within the chamber 38b or the chamber 39b, as the case may be. In order to counteract these radial thrusts, we provide passages 65 in the wall of the barrel 34b, which respectively communicate with the pressure chambers 38b and 39b at one end, and at their other ends communicate with chambers 66 and 67 formed in the exterior surface of the cylinder barrel 34b and the inner surface of the casing 20b.

Referring to Fig. 7 particularly, it will be seen that with pressure present in the chamber 38b, there will be a tendency for the barrel 34b to be thrust against the opposite wall of the casing, but such tendency is counteracted by reason of the fact that pressure will be transmitted through the passage 65 to the chamber 67 at the opposite side of the cylinder barrel, such pressure, of course, being dependent upon the degree of pressure within the chamber 38b. On the other hand, if 39b happens to be the pressure chamber, pressure will be transmitted to the opposite chamber 66. The passages 65 may be conveniently formed by coring out the inner surface of the casing 20b.

In Fig. 10, we show a structure wherein provision is made for counter-balancing radial pressures which result through forcing of liquid through conduits 70 and 71. If 70 should contain pressure, there will be a tendency for the cylinder barrel 72 to be forced away from that side of the casing 73 toward the opposite side thereof. Therefore, we provide a pipe 74 which communicates at one end with the conduit 70 and at its opposite end has branches 75 and 76 which direct fluid into chambers 77 and 78 to thus counterbalance back pressure against the cylinder barrel 72 from the conduit 70. To counterbalance back pressures from the conduit 71 when such conduit contains the high pressure, we provide a pipe 79 that communicates with the conduit 71 and has branches 80 and 81 leading into the chambers 82 and 83 respectively at the other side of the casing 73.

Another feature present in the structures of Fig. 10 (and also in Fig. 8) resides in tapering the barrel 72 slightly, so that it is of reduced diameter at its right hand end. As the periphery of the barrel becomes worn in service, it can be adjusted axially to effect snug fitting engagement with the bearing surfaces on the inner wall of the casing 73 by screwing up the rings or nuts 84 that support the thrust bearing 85 at the left hand end of the cylinder barrel 72.

Oil which may leak past the cylinder barrels or from certain connections at various points within the system will collect within the units 15 and 16 (Fig. 1), or either of them, and may be withdrawn therefrom by any suitable means and injected back into the system through the check valves 90 and 91 which are shown in Fig. 3, as discharging into the chambers 38 and 39. These valves will each open to admit such recovered liquid into its associated chamber 38 or 39 as the case may be when such associated chamber does not contain pressure or when it is functioning as a suction chamber. As the valves open inwardly, no oil under pressure can be discharged therethrough. These check valves can, of course, be connected to conduits which lead into other portions of the fluid circulating system.

In Fig. 11, we have shown details of the arrangement disclosed in Figs. 1 and 4, more particularly, for the purpose of more clearly disclosing the manner in which the power may be transmitted from the generating unit 15 to the motor units 16. As above explained, the units 16 function in a manner similar to the operation of the generating unit 15 through pressure supplied to chambers 38a and 39a within the units 16 to operate the pistons 35a thereof and through such pistons to effect turning movement of socket rings 30a.

The plates 23a of the unit 16 function to support the socket ring, but need not be tiltably adjustable as in the case of the swash plate 23 of the unit 15. The socket ring 30a carries a beveled gear wheel 95 and drives a shaft or axle 96 which is in turn connected to the traction wheel 17.

The cylinder barrel 34a has keyed thereto a shaft 97 which carries a beveled gear wheel meshing with the beveled gear wheel 95, so that the socket plate 30a and the cylinder barrel 34a will turn in synchronism. It will be seen that when pressure enters the chamber 38a for instance, the pistons at that side of the unit will be forced outwardly, thus effecting rotation of the socket ring 30a, the pistons on their inward or return stroke causing an exhaust of the fluid through the chamber 39a back to the low pressure side of the unit 15.

In Fig. 12, we show a generator unit 15c and motor units 16c. The operation of these units is substantially that described in connection with Figs. 1, 2, 4 and 11, except that the motor units are disposed at right angles to the axis of the generating unit and their cylinder barrels 34c, and the socket rings 30c are directly connected to axles or shafts 98 instead of utilizing two shafts 96—97, as in Fig. 11.

Pressure from one side of the unit 15c is directed through a conduit 40c and passages 41c and 42c to one side of each of the units 16c or through similar conduits at the other side of the unit 15c to the other sides of the units 16c, depending upon in which direction the mechanism is being operated.

In this Fig. 12, we also show pump mechanism for replenishing oil which may seep from the cylinders and other parts of the circulating system in the casings of the units. In this arrangement, we provide a central casing 99 into which the oil may be drained and be collected from the other casings. A pump 100 is connected to an extension of the shaft 18c. This pump is of the centrifugal type, and upon rotation thereof with the shaft will create suction in a pipe 101 which extends from a point within the casing upwardly into the base 102 of the pump, from which it will, through the rotary movement of the pump, be caused to flow in the directions indicated by the arrows 103 and thence through an outlet 104 and a conduit 105 to check valves 106 and 107 where it will again enter the system and thus automatically maintain a full supply of oil in the circulating system.

The pressure of the pump need not be very great since if the circulating system is not completely filled with oil, additional oil from the pump 100 will be forced into the system either from the valve 106 or 107, depending upon which of these valves happens to be at the low pressure side of the system. The check valves prevent backflow to the pump from the system through pressure exerted by the pistons. The pump being of the small centrifugal type, little power is required to operate the same, and it does not develop undesirable pressures.

A compression spring 108 serves to yieldably maintain the pump base 102 in engagement with the rotor portion of the pump 100 with a degree of pressure sufficient to prevent leakage of oil between the bearing surfaces of the base in the pump.

We claim as our invention:

1. The combination with a rotatable cylinder barrel having a plurality of bores arranged about its axis, the bores being open at their inner ends, and a piston reciprocable in each bore, of a supporting member against which the inner end of the barrel abuts and which has circumferentially spaced chambers with which the said bores are successively brought into registry during rotation of the barrel, and means radially offset from the axis of the barrel, controlled by pressure within one of said chambers for holding the barrel in a given cooperative relation with said member, the said means incompletely surrounding the axis of the barrel.

2. The combination with a rotatable cylinder barrel having a plurality of bores arranged about its axis, the bores being open at their inner ends, and a piston reciprocable in each bore, of a supporting member against which the inner end of the barrel abuts and which has circumferentially-spaced chambers with which the said bores are successively brought into registry during rotation of the barrel, a pull rod radially offset from the axis of the barrel, interengaging means between said pull rod and the cylinder barrel for supporting the barrel against tilting movement, an auxiliary piston having connection with said rod, and means for directing fluid pressure from one of said chambers against said auxiliary piston to exert an inward pulling force on said rod and the cylinder barrel, to hold the barrel in a given cooperative relation with the supporting member.

3. The combination with a rotatable cylinder barrel having a bore extending longitudinally thereof and open at its inner end, the bore being radially offset from the axis of the barrel, and a piston reciprocable in said bore, of a supporting member against which the inner end of the barrel abuts, the said member having a passageway communicating with said bore, of an auxiliary piston supplied with pressure from said passageway, and connecting means between said piston and the cylinder barrel for exerting an inwardly-directed pulling force on said barrel for holding it in a given co-operative relation with the supporting member upon actuation of said piston by pressure within the said chamber, the said connecting means being radially offset from the axis of the barrel.

4. The combination with a rotatable cylinder barrel containing a cylindrical bore having a discharge opening at one end, of substantially the diameter of the bore, and a piston reciprocable therein, of a bearing surface for said end of the barrel, and means radially offset from the axis of the barrel, controlled by piston pressure for holding the said barrel in working engagement with the said surface, the said means incompletely surrounding the axis of the barrel.

5. The combination with a rotatable cylinder barrel containing a plurality of circumferentially-spaced cylindrical bores which extend parallel to the axis of the barrel and each bore having a discharge opening of substantially the diameter of the bore, and a piston reciprocable in each bore, of a bearing surface for said barrel having conduits for the passage of fluid into and from said bores, and means radially offset from the axis of the barrel, controlled by piston pressure for holding the said barrel in working engagement with the said surface, the said means incompletely surrounding the axis of the barrel.

6. The combination with a rotatable cylinder barrel contaning a cylindrical bore having a discharge opening at one end, and which is radially offset from the axis of the barrel, and a piston reciprocable in the bore, of a bearing surface for said end of the barrel, and means controlled by piston pressure for holding the said barrel in working engagement with the said surface, the said means being disposed externally of the said bore and radially offset from said axis but not completely surrounding the same.

7. The combination with a rotatable cylinder barrel having a bore extending longitudinally thereof and open at its inner end, and which is radially offset from the axis of the barrel, and a piston reciprocable in the bore, of a supporting member against which the inner end of the barrel abuts having a passageway communicating with said bore, and means actuated by the piston pressure for holding the said barrel in working engagement with the supporting member, the said means being disposed externally of the said bore and radially offset from said axis but not completely surrounding the same.

8. The combination with a rotatable cylinder barrel having a bore extending longitudinally thereof and open at its inner end, and which is radially offset from the axis of the barrel, and a piston reciprocable in the bore, of a supporting member against which the inner end of the barrel abuts having a passageway communicating with said bore, means for yieldably holding the barrel against the supporting member in opposition to piston pressure, and means controlled by piston pressure for supplementing said yielding means, the last-named means being disposed externally of the said bore and radially offset from said axis but not completely surrounding the same.

9. The combination with a rotatable cylinder barrel containing a cylindrical bore offset from the axis of the barrel and having a discharge opening at one end of the barrel, and a piston reciprocable in the bore, of a bearing surface for said end of the barrel, a thrust bearing surface on the barrel similarly offset from said axis, and means having engagement with said thrust bearing surface and actuated by piston pressure to maintain the barrel in engagement with the first-named bearing surface, the said means incompletely surrounding the axis of the barrel.

10. The combination with a rotatable cylinder barrel having a plurality of bores arranged about its axis, and a piston reciprocable in each bore, of a supporting member against which the inner end of the barrel abuts and which has circumferentially spaced chambers with which the said bores are successively brought into registry during rotation of the barrel, means controlled by the pressure in one of the said chambers for holding the barrel against the said member, and means controlled by the pressure in the other chamber for holding the barrel against the said member, each of said means being independently responsive to the pressure within its associated chamber.

11. The combination with a rotatable cylinder barrel containing a plurality of cylindrical bores offset from the axis of the barrel in opposite directions, and a piston reciprocable in each bore, of a bearing surface having two diametrically opposite ports having periodic communication with the bores during rotation of the barrel, and means acted upon by fluid pressure from each of the said ports to hold the barrel against the said bearing surface, the said means being relatively offset in opposite directions from the axis of the barrel and in directions circumferentially of said axis.

12. The combination with a rotatable cylinder barrel containing a plurality of cylindrical bores offset from the axis of the barrel in opposite directions, and a piston reciprocable in each bore, of a bearing surface having two diametrically opposite ports having periodic communication with the bores during rotation of the barrel, means acted upon by fluid pressure from one of said ports to hold the barrel against that portion of the said bearing surface which is adjacent to the said port, and means responsive to the fluid pressure from the other port to hold the barrel against that portion of the said bearing surface which is adjacent to the other port.

In testimony whereof we, the said JAMES CARRIE and GEORGE E. HOWARD, have hereunto set our hands.

JAMES CARRIE.
GEORGE E. HOWARD.